R. SHALER.
Water-Pressure Gage.
No. 15,624.                                    Patented Aug. 26, 1856.
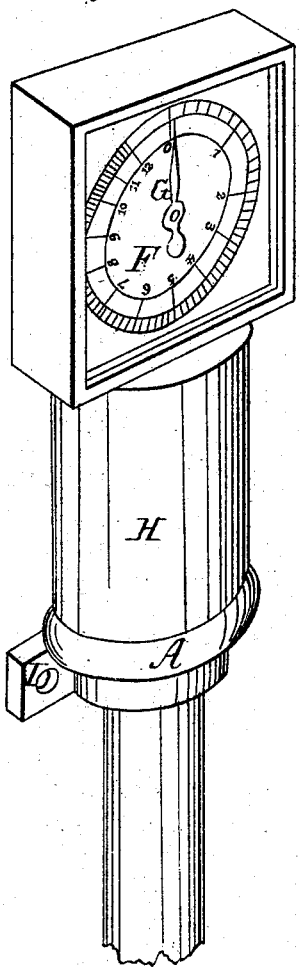
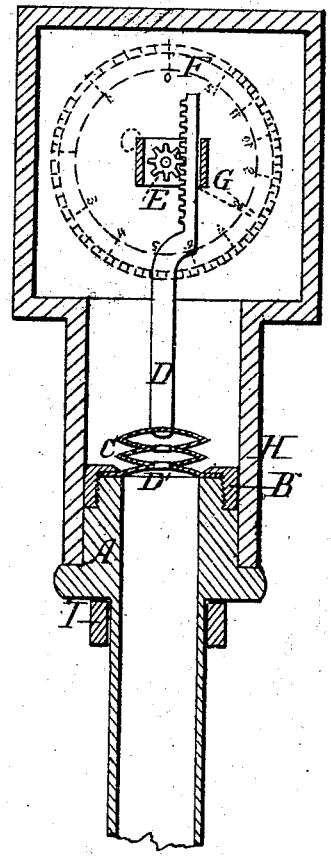
Witnesses,
S. B. Ellithorp
Francis S. Low
Inventor,
Reuben Shaler.

UNITED STATES PATENT OFFICE.

REUBEN SHALER, OF MADISON, CONNECTICUT.

BILGE AND LEAKAGE WATER INDICATOR FOR SHIPS AND OTHER VESSELS.

Specification of Letters Patent No. 15,624, dated August 26, 1856.

*To all whom it may concern:*

Be it known that I, REUBEN SHALER, of Madison, in the county of New Haven and State of Connecticut, have invented a new and Improved Apparatus for Showing the Depth of Water in the Hold of a Vessel, which I denominate the "Hydropneumatic Leakage-Meter;" and I do hereby declare that the following is a full and exact description thereof, reference being had to the accompanying drawings and to the letters of reference marked thereon.

The nature of my invention consists in a sectional diaphragm spring so constructed and arranged as to give motion to an index for showing the depth of water in the hold of a vessel by the compression of air in a tube by the leakage water.

Figure 1 in the accompanying drawings is a perspective view of the apparatus, and Fig. 2 is a vertical section (taken through the center and looking toward the dial-plate) showing the arrangement of its working parts.

A is a metallic chamber, to the pipe of which is attached a pipe that runs down to the bottom of the hold of the vessel to which the apparatus is attached. The upper portion of its exterior is turned down and has a screw-thread cut upon it to permit the nut B to be screwed down upon it. The nut has an interior flange upon its upper edge of the same diameter as the interior of the chamber A, and its exterior diameter is made to coincide with the exterior of the chamber A, so that the two when screwed together shall present a plane surface on the outside.

C is an india-rubber spring formed of one or more sections of double diaphragm plates, the lower edge of the bottom one being attached to the perforated plate of rubber D', which is secured in place and forms an air-tight joint by being secured between the top edge of the chamber A and the lower side of the flange on the nut B, when the nut is screwed down to place. The sections are formed of annular plates, connected together at the outer edges, and connected to each other and to the plate D' by their inner edges (with the top plate of the series made whole to prevent the passage of air through it) for the purpose of producing a greater amount of motion in the spring than could be produced by a spring made of a single plate unless it were made inconveniently large. The number of sections required to form the spring will be dependent upon the depth of the hold of the vessel, a shallow vessel requiring a lesser number than a deep one. D a standard, secured air-tightly to the top plate of the upper section of the spring, the upper portion of which is cut into cogged teeth for the purpose of gearing in, and giving motion to the pinion E, the shaft of which pinion projects through the dial-plate F and carries the index G. The dial-plate is divided into spaces representing feet and inches corresponding with the depth of the vessel. The position of the divisions on the dial of each apapratus is ascertained by experiments and trial, as an alteration either in the length of pipe required to reach the bottom of the hold, or in the size of the pipe used for that purpose, or in the elasticity of the spring would require an alteration in the position of the divisions. H casing to inclose the chamber A and form a support for the attachment of the pinion E and the dial-plate F. I the bracket by which the apparatus is secured in position either in the cabin or other part of the vessel as may be desired.

Each apparatus is tested by attaching to it the length of pipe required to reach the bottom of the hold of the vessel and inserting the pipe in a test-pipe, closed at the bottom and with apertures in it at each foot of its height, which is filled with water equal in height to the extreme height to be indicated on the dial. The compression of air within the pipe and the chamber A, by the rise of the water within the pipe, causes the spring C to elongate and raise the standard D and revolve the pinion E and the index G. The indication is then marked on the dial-plate, the water let out of the test pipe to the next foot in height and the indication similarly marked, and so on until the water reaches the bottom of the pipe of the apparatus, which gives the zero indication to the dial, or the operation may be reversed and the zero indication be first made on the dial and the subsequent indications of each addition of a foot of water in the test-pipe marked upon it. Its operation when placed on the vessel will then be a counterpart of the operation described above, the rise of the water in the hold compressing the air within the pipe and the index on the dial measuring and showing its depth. There may be a coiled spring placed on the pinion shaft to aid the retrograde motion of the index (a stop being placed on the dial-plate to prevent the index going back beyond the zero mark) or a counter weight may be placed on the standard D for the same purpose, but I have not found them necessary in practice as the elasticity of the spring C is amply sufficient to produce that effect.

This apparatus may be placed in the cabin or such other portion of the vessel as may be desired when the indications may be plainly perceived by every person inspecting it, and it will show unerringly the depth of water in the hold from leakage or other cause without the necessity of sounding the pumps as is usually done.

What I claim as my invention and desire to secure by Letters Patent in bilge and leakage indicators, is—

The sectional diaphragm spring C as arranged in relation to the chamber A and the standard D for the purpose, and operating as herein described.

REUBEN SHALER.

Witnesses:
S. B. ELLITHORP,
FRANCIS S. LOW.